Patented Sept. 19, 1933

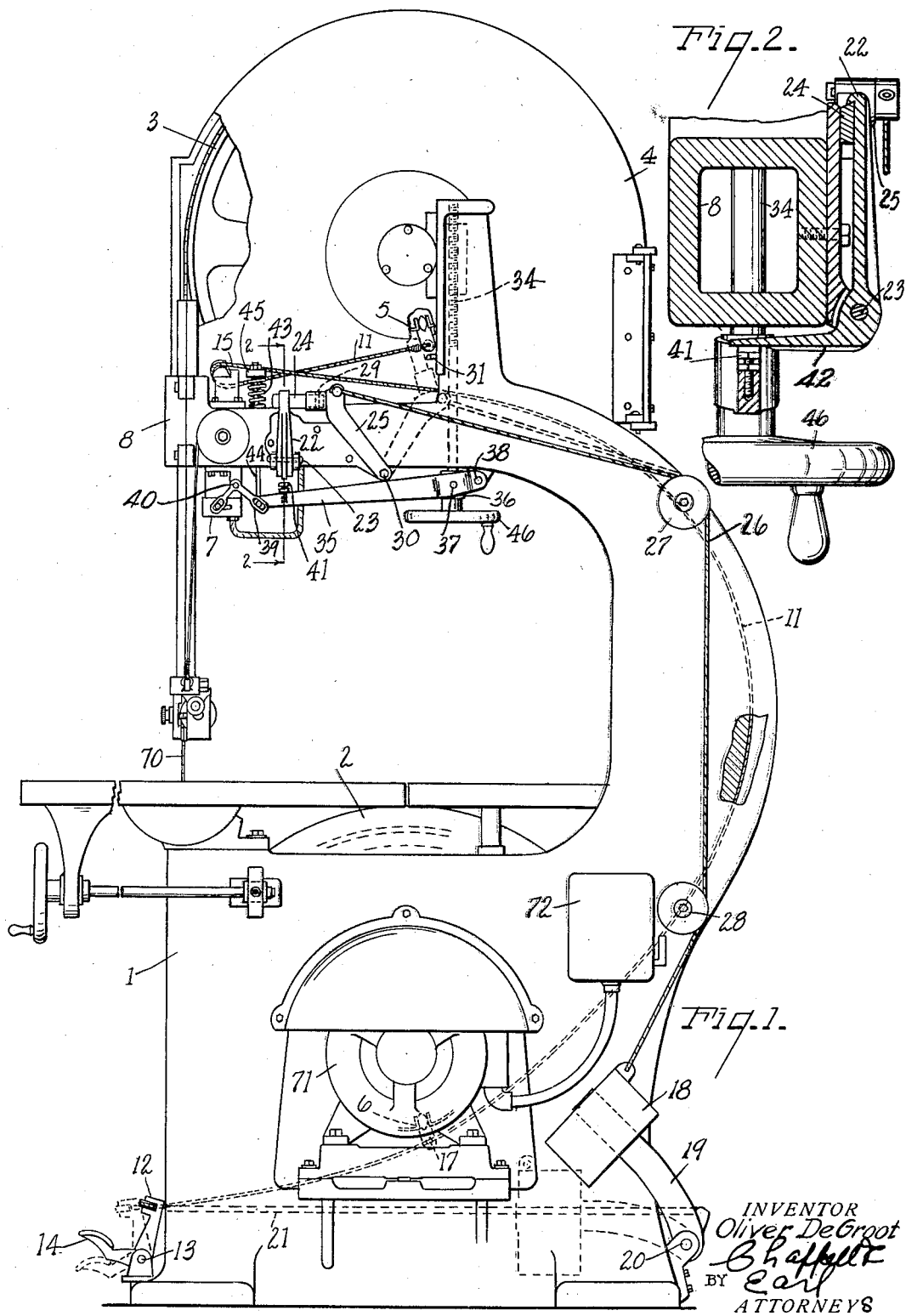

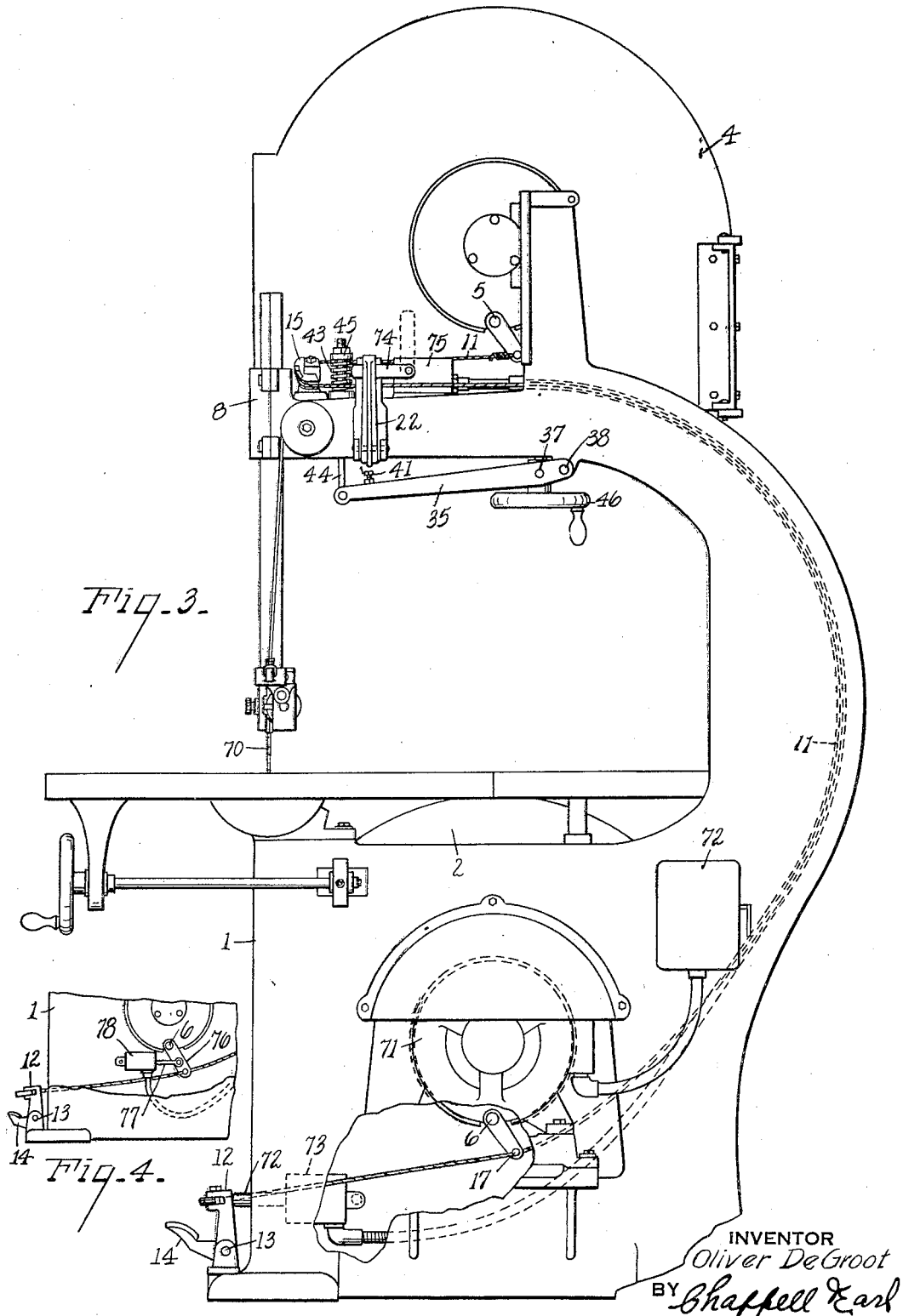

1,927,203

UNITED STATES PATENT OFFICE 1,927,203

BRAKE DEVICE FOR BAND SAWS

Oliver De Groot, Grand Rapids, Mich., assignor to The Tannewitz Works, Grand Rapids, Mich.

Application December 2, 1932. Serial No. 645,372

6 Claims. (Cl. 143—17)

The main objects of my invention are:

First, to provide an improved automatic emergency brake applying device for band saws and the like.

Second, to provide a device of this character, which operates to immediately open the driving motor circuit and brake the saw carrying wheels on the snapping or releasing of the saw.

Third, to provide a brake applying device that is simple and economical in its parts and efficient and effective in operation.

Fourth, to provide means in a device of this character for permitting the tensioning of the saw without setting the emergency brake.

Objects relating to details and economies of my invention will appear from the description to follow. The invention is defined and pointed out in the claims.

A structure which is a preferred embodiment of my invention is illustrated in the accompanying drawings, in which:

Fig. 1 is a fragmentary view in side elevation of a band saw embodying the features of the invention.

Fig. 2 is an enlarged fragmentary transverse vertical section on a line corresponding to line 2—2 of Fig. 1.

Fig. 3 is a fragmentary view in side elevation of a modification.

Fig. 4 is a fragmentary view of a further modification.

In the embodiment of my invention illustrated by Figs. 1 and 2 of the accompanying drawings, the frame 1 is of suitable design to receive and support various parts of the mechanism. Certain parts are shown on the outside of the frame for convenience in illustration, which might be housed within the frame in certain embodiments of my invention.

The lower band saw wheel is conventionally illustrated at 2 and the upper wheel at 3. The upper band saw wheel is arranged in an assembly designated generally by the numeral 4 and comprising a housing. The wheels 2 and 3 are provided with brakes 5 and 6, respectively, fragments only of which are illustrated. The saw is conventionally illustrated at 70.

The wheel 2 is driven by a motor indicated conventionally at 71, which is controlled by the switch 72 and the emergency switch 7 mounted on the arm 8 of the column.

The brakes are adapted to be simultaneously actuated through the cable 11 which is connected at its lower end to the arm 12 on the rockshaft 13 of the treadle or foot lever 14. The cable is passed over suitable guides in the column to the rocker 15 which is in turn connected by the cable 11 to the upper band wheel brake. The cable is connected to the brake of the lower band wheel at 17.

The brakes are urged to braking position by means of the weight 18 carried by the arm 19 which is pivoted at 20 and connected to the arm 12 by the link 21 so that when the weight is released the brakes are actuated through the weight. The weight is held in non-braking position by the catch or trigger 22 which is pivoted at 23 to coact with the extension 24 of the arm 25 to which the weight is connected by the cable 26 passing over guide pulleys 27 and 28. The arm 25 is pivoted at 30 to the column. The movement of the arm 25 is limited by the stop pin 31.

The extension 24 is connected to the arm 25 by the vertical pivot 29 permitting a limited movement. The pivot 29 is disposed at right angles to the pivot 23 of the trigger so that the trigger or catch will release the arm only when the trigger is suddenly actuated. If actuated slowly, the pivoted portion 24 of the arm will follow the movement of the catch or trigger.

The upper band saw wheel assembly is carried by the vertically disposed screw 34 which is in turn supported by the tension lever 35, the screw being supported by the collar 36 pivoted at 37 on the tension lever 35 which is in turn pivoted at 38 on the column. The outer end of the lever 35 is connected to the switch actuating bell crank lever 39. This lever is pivoted to the switch housing at 40, the connection being such that upward movement of the lever 35 actuates the switch lever 39 and opens the cutout switch designated generally by the numeral 7, thereby opening the energizing circuit of the motor.

The lever 35 is provided with a tappet 41 coacting with the inwardly projecting arm 42 on the latch or brake releasing trigger. The lever is urged upwardly into saw tensioning position by means of the compression spring 43 which is arranged about the rod 44 between the arm 8 on the column and a thrust collar 45 on the rod.

With the saw in position on the wheels, it may be rendered taut by turning the handwheel 46 of the screw 34 and the tension lever is urged downwardly by the load to which it is subjected by this adjustment compressing the spring. Should the saw blade break, the tension lever is released from the restraint or its thrust on the saw and the lever swings upwardly under the action of the spring 43 striking the arm 42 of the catch a sharp blow, releasing the weight restraining arm 25, allowing the weight to drop, and thereby applying the brakes. With the bolt or extension 24 of the arm 25 connected thereto by a pivot, the catch will not become disengaged when the tension on the blade is slowly relieved by the operator, permitting the tappet on the tension lever to engage the trip or trigger. However, when the tension lever is suddenly released, as by breaking of the saw blade, it strikes the arm of the trigger a sharp blow which will release the catch as described.

Referring to Fig. 3, there is illustrated a modification wherein the brake lever 12 is actuated by the plunger 72 of the solenoid 73 when the trigger 22 releases the switch arm 74 by the breaking of the saw blade 70. The switch arm is urged to vertical circuit closing position by a spring within the switch housing 75, so that when it is released from the trigger 22 it immediately closes the energizing circuit of the solenoid, which thereupon operates the plunger to set the brakes by advancing the brake lever 12.

In Fig. 4, there is illustrated a further modification in which the brakes are applied by individual solenoids. The arm 76 of the lower wheel brake is connected to the plunger 77 of the solenoid 78. In a similar manner, the upper wheel brake is provided with a solenoid (not shown), so that the closing of the solenoid control switch 75 by the breaking of the saw blade causes both solenoids to set the upper and lower wheel brakes at the same time.

From the above description, it will be apparent to those skilled in the art that the invention provides an automatic emergency brake applying device which is simple in construction, yet efficient in operation, and which obviates injury to the operator and to the machine in case the saw blade breaks or runs off of its carrying wheels. Further, the tensioning of the saw blade may be effected without releasing the emergency brake applying mechanism.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Having thus described my invention what I claim as new and desire to secure by Letters Patent is:

1. A band saw comprising a band saw wheel assembly, a screw supporting said assembly, a tension lever supporting said screw, means urging said lever to saw tensioning position, a motor circuit opening switch operatively connected to said lever, a bell crank latch lever disposed in the path of said tension lever, a pivoted arm, a bolt coacting with said latch lever and pivoted to said arm crank at right angles to the pivot of said latch lever whereby the bolt is released from the latch lever only when the latch lever is suddenly actuated by said tension lever, and wheel braking means controlled by said arm.

2. A band saw comprising a band saw wheel assembly, a screw supporting said assembly, a tension lever supporting said screw, means urging said lever to saw tensioning position, a motor circuit opening switch operatively connected to said lever, and a bell crank latch lever disposed in the path of said tension lever, a pivoted arm having a pivoted extension coacting with said latch lever and adapted to be released only when the latch lever is struck sharply by said tension lever, and wheel braking means controlled by said arm.

3. In a band saw, the combination with a pair of band saw wheels each provided with a brake, one of the wheels being mounted for adjustment to tension the saw, a tension lever, an adjusting screw for said adjustable wheel carried by said lever, a tension spring acting on said lever, a catch having an arm disposed in the path of said tension lever, a brake actuating means common to both of said saws and including a pivoted arm provided with a pivoted extension coacting with said catch, whereby the relatively slow release of said tension lever will not disengage the catch but quick release of the tension lever, such as occurs with the breaking of the saw, permits the tension lever to strike the catch a blow, thereby releasing it, and means actuated by the release of said tension lever for opening the control switch.

4. In a band saw, the combination with a pair of band saw wheels each provided with a brake, one of the wheels being mounted for adjustment to tension the saw, a tension lever, an adjusting screw for said adjustable wheel carried by said lever, a tension spring acting on said lever, a catch having an arm disposed in the path of said tension lever, a brake actuating means common to both of said saws and including a pivoted arm provided with a pivoted extension coacting with said catch whereby the relatively slow release of said tension lever will not disengage the catch but quick release of the tension lever, such as occurs with the breaking of the saw, permits the tension lever to strike the catch a blow, thereby releasing it.

5. A band saw comprising a band saw wheel assembly, a screw supporting said assembly, a tension lever supporting said screw, means urging said lever to saw tensioning position, a motor circuit opening switch operatively connected to said lever, a bell crank latch lever disposed in the path of said tension lever, a pivoted switch arm, a bolt coacting with said latch and pivoted to said crank at right angles to the pivot of said latch whereby the latch is released from the arm only when the latch is suddenly actuated by said tension lever, and electrical wheel braking means controlled by said arm.

6. In a band saw, the combination with a swingable tension lever having means to tension the upper wheel of the band saw, a pivoted catch having an arm disposed in the path of said tension lever when released, brake control means including a pivoted arm provided with an extension normally frictionally engaged and movable with said catch whereby the relatively slow release of said tension lever will not disengage the catch from the extension, but quick release of the tension lever, such as occurs with the breaking of the saw, causes the tension lever to strike the catch arm a blow, thereby releasing the catch from the extension due to the inertia of the extension, and means tending to rotate said pivoted arm.

OLIVER DE GROOT.